(No Model.)
J. F. MATTHEWS & F. HELEY.
SAUSAGE MACHINE.
No. 497,127. Patented May 9, 1893.
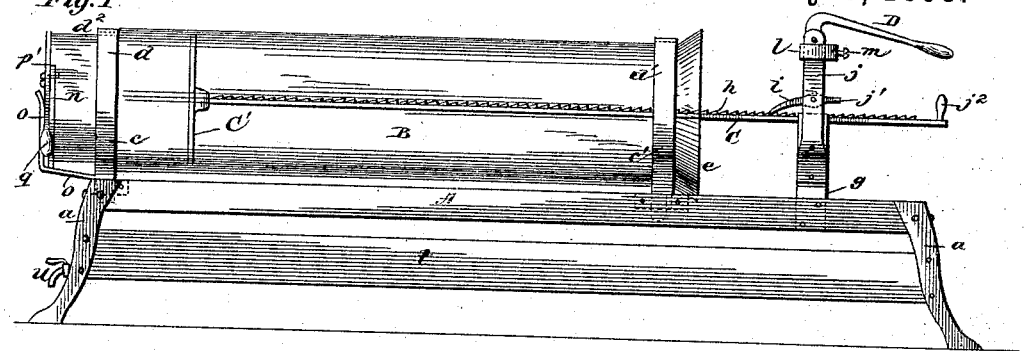
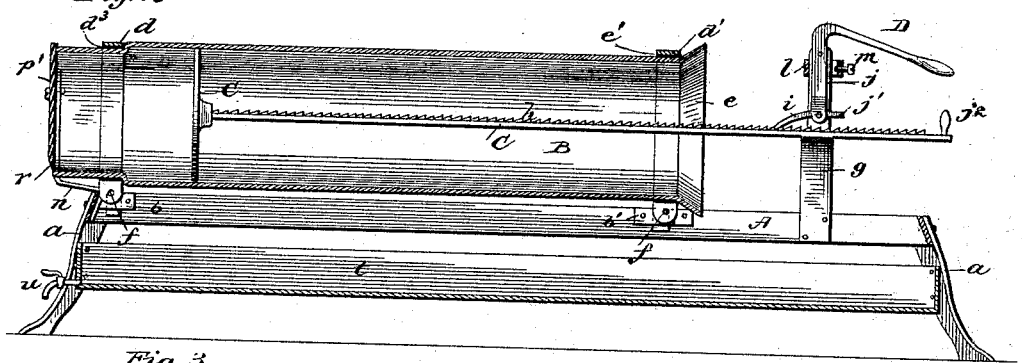
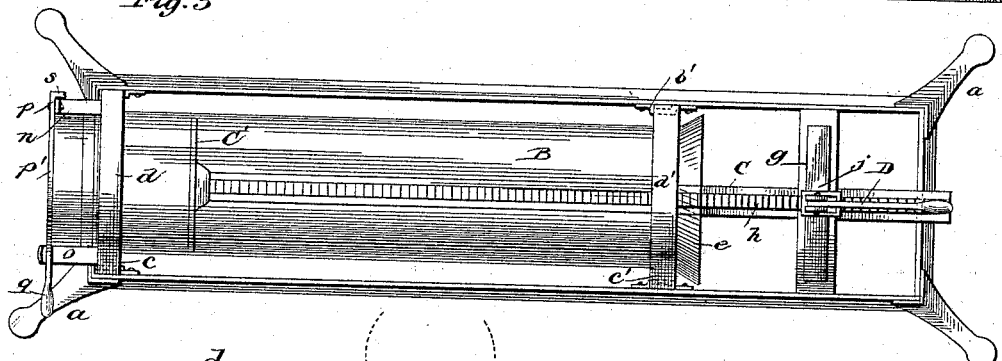
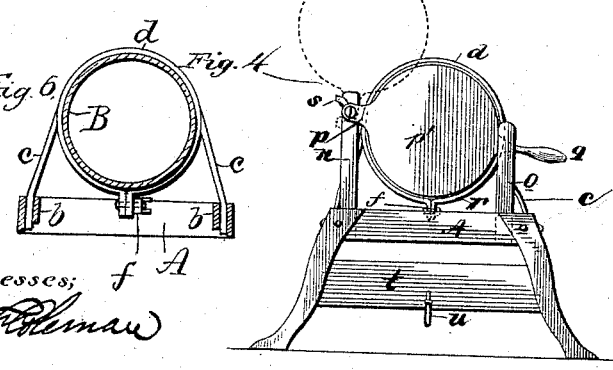
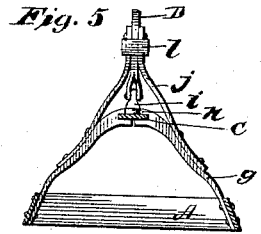
Witnesses:
Inventor

UNITED STATES PATENT OFFICE.

JAMES F. MATTHEWS AND FRANK HELEY, OF LIDGERWOOD, NORTH DAKOTA.

SAUSAGE-MACHINE.

SPECIFICATION forming part of Letters Patent No. 497,127, dated May 9, 1893.

Application filed June 6, 1892. Serial No. 435,675. (No model.)

*To all whom it may concern:*

Be it known that we, JAMES F. MATTHEWS and FRANK HELEY, residing at Lidgerwood, in the county of Richland and State of North Dakota, have invented certain new and useful Improvements in Sausage-Machines; and we do hereby declare the following to be a full, clear, and exact description of the invention, such as will enable others skilled in the art to which it appertains to make and use the same.

Our invention relates to an improvement in machines for containing and dispensing sausage,—the object of the invention being to produce a machine for containing sausage and to so construct and arrange the machine that by the operation of a lever the sausage will be forced out in certain predetermined quantities so as to avoid the necessity of weighing the sausage.

A further object is to so construct the machine that a certain amount of sausage will be forced out at each operation of a lever, and to provide means whereby said lever may be adjusted to compensate for difference in weight of sausage.

A further object is to provide a device for holding and dispensing sausage, with devices for forcing the sausage out in certain quantities and cutting the sausage thus forced out of the device from the main body of the sausage within the device.

A further object is to produce a machine for holding and dispensing sausage which shall be simple in construction, easy to operate and effectual in the performance of its functions.

With these objects in view the invention consists in certain novel features of construction and combinations and arrangements of parts as hereinafter set forth and pointed out in the claims.

In the accompanying drawings: Figure 1 is a side elevation of our improved machine. Fig. 2 is a longitudinal sectional view. Fig. 3 is a plan view. Fig. 4 is a front end view. Fig. 5 is a sectional view. Fig. 6 is a detail.

A represents an elongated open frame, which is supported by legs or uprights $a$, secured at their upper ends to the ends of the frame A by means of screws or otherwise. Projecting from the inner faces of the side bars of the frame A at the forward ends thereof, are arms $b$ and projecting from said inner faces of the side bars of the frame in proximity to the inner ends thereof, are arms $b'$. These brackets are adapted to receive and support the notched lower ends of brackets $c, c'$, which are secured to or made integral with bands or straps $d, d'$, said bands or straps being adapted to encircle the respective ends of a glass or other non-corrosible cylinder B. At the forward end of the cylinder B, it is made with a depression $d^2$ for the reception of the band or strap $d$, thus preventing endwise movement of said cylinder,— a ring of rubber or other flexible material $d^3$ being inserted between the band or strap $d$ and the cylinder. The rear end of the cylinder is provided with a flaring mouth $e$ against which the band or strap $d'$ is adapted to abut, a ring of rubber or other flexible material $e'$ being inserted between said band or strap $d'$ and the cylinder. The bands or straps $d, d'$, are both made open under the cylinder B and their free ends project downwardly. Perforations are made through the depending ends of the straps or bands $d, d'$, for the reception of set screws $f$, whereby said straps may be made to tightly embrace the cylinder, breakage of the cylinder being prevented by the flexible rings $d^3, e'$. Secured to and projecting upwardly and inwardly from the side bars of the frame A at points inwardly from the inner end of the cylinder B, are arms $g$ which, together constitute a bracket for the support of a plunger rod C, to the forward end of which a plunger C' is secured and adapted to enter the cylinder B, the ready insertion of said plunger into the cylinder being facilitated by the flaring mouth $e$ of the cylinder. The upper, inwardly projecting ends of the arms $g$ are provided with recesses for the reception of the edges of the plunger rod C whereby the latter may have a free sliding movement when actuated in the manner hereinafter explained. A rack bar $h$ is secured to or made integral with the top face of the plunger rod C and is adapted to be engaged by a dog $i$ pivotally supported in one end of an operating lever D. The lever D is pivotally supported at a point between its ends, in the upper ends of arms $j$, which project upwardly from the arms $g$. The inner end of the plunger rod C is provided with a handle $j^2$ whereby to withdraw the plunger, and the dog $i$ is made with an inwardly projecting arm $j'$ whereby to release it from the rack bar when it is desired to withdraw the plunger, said dog being maintained normally in engagement with the rack bar by its own weight. The lever D, and dog $i$ are so arranged relatively to the teeth of the rack bar $h$, that at each operation or vibration of the lever, a certain predetermined amount of sausage (say one pound) will be forced out the forward end of the cylinder B, thus avoiding the necessity of weighing the sausage. As the weight of the bulk of sausage employed may vary with different lots of sausage, it is necessary to provide some means for regulating the stroke of the lever D and consequently the dog $i$, so that the desired weight of sausage will be forced out at each stroke of the lever. For this purpose a collar $l$ is placed around the arms $j$ near their upper ends and a set screw $m$ passed through said collar and adapted to be struck by the lower arm of the lever D. By this means the stroke of the lever and the reciprocation of the dog $i$ can be easily and effectually regulated.

Secured to the forward end of the frame A, are two upwardly projecting arms $n, o$. To the upper end of the arm $n$, a shank $p$ of a disk $p'$, is pivotally connected, said disk being adapted to close the forward end of the cylinder B. The free edge of the disk $p'$ is provided with a handle $q$ and is adapted to enter the space between the arm $o$ and the forward end of the cylinder B, said arm $o$ assisting in withstanding the pressure brought to bear against the disk. The lower edge of the disk $p'$ is made with a sharp edge $r$ to produce a knife, so that it will be seen that the disk $p'$ serves the two-fold purpose of closing the end of the cylinder B and as a knife to cut the sausage forced through said cylinder. Projecting from the shank $p$ of the knife or disk $p'$, is an ear or projection $s$ which, when the disk or knife $p'$ is in position to close the end of the cylinder B, strikes the upper end of the arm $n$ and thus prevents the knife or disk from moving down too far. When the knife or disk $p'$ is raised to permit the sausage to be forced through the cylinder, it will be supported by the engagement of the ear $s$ with the arm $n$ at a point below the pivotal connection of the stem or shank $p$.

When it is desired to fill the cylinder B the plunger will be withdrawn as above explained, and the cylinder with its supporting devices will be lifted off the frame A in an obvious manner. An ice pan $t$ will preferably be supported by the frame A, under the cylinder B, said pan being provided with a faucet $u$, whereby to draw water off.

The device is very simple in construction and a very useful device for butchers as the sausage can be forced out and cut off in predetermined quantities.

Having fully described our invention, what we claim as new, and desire to secure by Letters Patent, is—

1. The combination with a frame and a receptacle supported thereby, of arms projecting from said frame and having recesses in their free ends, a plunger rod adapted to move in said recesses, a plunger carried by the plunger rod, a rack bar also carried by the plunger rod, a pivoted dog to engage the rack bar and a lever connected with said dog, whereby to actuate it, substantially as set forth.

2. The combination with a frame, of arms projecting therefrom, arms or brackets adapted to be received by the arms on the frame, bands or straps carried by said arms or brackets, a receptacle carried by said bands or straps, and means for forcing material through said receptacle, and a knife for cutting said material as it is forced through the receptacle, substantially as set forth.

3. The combination with a frame, of straps, means for supporting said straps on the frame, a receptacle supported by said straps, set screws passing through the free ends of the straps for securing them to the receptacle, a plunger for said receptacle and means for operating said plunger to force the material through the receptacle, substantially as set forth.

4. The combination with a frame, of a receptacle having an annular depression at one end and a flaring mouth at the other end, a strap in said depression, a flexible ring between the strap and the receptacle, a strap encircling the other end of the receptacle, a flexible ring between the last mentioned strap and the receptacle, set screws for tightening said straps, and means for supporting said straps on the frame, substantially as set forth.

5. The combination with a frame, a receptacle carried by said frame and means for forcing material through said receptacle, of an arm projecting from the forward end of said frame, a disk having a knife edge, supported by said arm, and a handle carried by said disk, substantially as set forth.

6. The combination with a frame, a receptacle carried by said frame and means for forcing material through said receptacle, of an arm projecting from the forward end of said frame, a knife pivotally connected with said arm, and a stop carried by said knife and adapted to engage said arm, substantially as set forth.

7. The combination with a frame, a receptacle carried by said frame and means for forcing material through said receptacle, of an arm projecting from said frame, a knife carried by said arm and an arm or guard carried by the frame to receive the free edge of said knife, substantially as set forth.

8. The combination with a frame, of a receptacle carried by said frame, means for forcing material through said receptacle, and a pan supported by the frame, under the receptacle, for supporting ice, substantially as set forth.

In testimony whereof we have signed this specification in the presence of two subscribing witnesses.

JAMES F. MATTHEWS.
FRANK HELEY.

Witnesses to signature of James F. Matthews:
C. J. ROCKWOOD,
ETTA MCCALL.

Witnesses to signature of Frank Heley:
W. I. IRVINE,
F. PARIZEK.